(12) United States Patent
Platz et al.

(10) Patent No.: US 11,471,964 B2
(45) Date of Patent: Oct. 18, 2022

(54) METHOD FOR THE PRODUCTION OF DRILL HOLES IN DIFFICULT TO MACHINE MATERIALS

(71) Applicant: MTU Aero Engines AG, Munich (DE)

(72) Inventors: Albin Platz, Ried-Baindlkirch (DE); Nicole Feiling, Munich (DE); Anna Carina Kuepper, Munich (DE); Norbert Huber, Ueberacker (DE)

(73) Assignee: MTU Aero Engines AG, Munich (DE)

(*) Notice: Subject to any disclaimer, the term of this patent is extended or adjusted under 35 U.S.C. 154(b) by 58 days.

(21) Appl. No.: 16/534,790

(22) Filed: Aug. 7, 2019

(65) Prior Publication Data

US 2020/0047270 A1 Feb. 13, 2020

(30) Foreign Application Priority Data

Aug. 9, 2018 (DE) ...................... 10 2018 213 392.1

(51) Int. Cl.
*B23H 3/00* (2006.01)
*B23H 7/26* (2006.01)
*B23H 9/10* (2006.01)

(52) U.S. Cl.
CPC ................. *B23H 3/00* (2013.01); *B23H 7/26* (2013.01); *B23H 9/10* (2013.01)

(58) Field of Classification Search
CPC .................................. B23H 9/006; B23H 9/14
USPC .................................................... 205/63, 663
See application file for complete search history.

(56) References Cited

U.S. PATENT DOCUMENTS

| 3,594,298 | A | | 7/1971 | Abt | |
|---|---|---|---|---|---|
| 5,320,721 | A | | 6/1994 | Peters | |
| 5,820,744 | A | * | 10/1998 | Edwards | B23H 3/02 205/640 |
| 6,387,242 | B1 | * | 5/2002 | Wei | B23H 9/00 204/224 M |
| 6,835,299 | B1 | * | 12/2004 | Tchugunov | B23H 3/00 204/222 |

(Continued)

FOREIGN PATENT DOCUMENTS

| DE | 4428207 A1 | 2/1996 |
|---|---|---|
| DE | 102006025456 A1 | 12/2007 |

(Continued)

OTHER PUBLICATIONS

Machine translation of DE102010032326 of Burger et al. (Year: 2012).*

(Continued)

*Primary Examiner* — Brian W Cohen
(74) *Attorney, Agent, or Firm* — Barlow, Josephs & Holmes, Ltd.; David R. Josephs

(57) ABSTRACT

The present invention relates to a method for the production of drill holes in difficult to machine materials, in which a removal of material takes place in order to produce a drill hole by electrochemical erosion of material by an electrode that is moved in the longitudinal direction of the drill hole being produced in the direction onto the material to be processed at a feed rate, wherein the drilling has at least two steps, wherein, in the first step, the electrochemical processing takes place, and wherein, in a second step, the further processing of the drill hole to the final diameter takes place by machining processing or by erosion or by an electrochemical processing.

10 Claims, 6 Drawing Sheets

(56) References Cited

U.S. PATENT DOCUMENTS

2007/0017817 A1* 1/2007 Mueller .................. B22F 5/04
                                                    205/640
2012/0285820 A1   11/2012 Li et al.

FOREIGN PATENT DOCUMENTS

| DE | 102006051719 A1 | 5/2008 |
| DE | 102010032326 A1 | 2/2012 |
| EP | 2468422 A2 | 6/2012 |
| WO | 2015122103 A1 | 8/2015 |

OTHER PUBLICATIONS

Machine translation of EP2468442 of Hlavac et al. (Year: 2012).*
Dissertation Brunel University, London, United Kingdom, Mar. 2015, "Development of an Electrochemical Micromachining (μECM) machine", Spieser, Alexandre.
Dissertation, University of Bristol, UK, Jul. 2003, "Advances in the deep-hole drilling technique for residual stress measurement", Kingston, Edward James.
Paper, College of Engineering, Pune, Maharashtra, India, Feb. 25, 2011, "Enhancement of surface finish of Electrochemically (EC) drilled deep hole using Rotating electrode", Jadhav, P. V., Bilgi, S. D.

* cited by examiner

METHOD FOR THE PRODUCTION OF DRILL HOLES IN DIFFICULT TO MACHINE MATERIALS

BACKGROUND OF THE INVENTION

The present invention relates to a method for the production of drill holes in difficult to machine materials, in which a removal of material takes place in order to produce a drill hole by electrochemical erosion of material, as well as an electrode used therefor.

In the mechanical processing of materials that are stable at high temperatures, such as alloys produced via powder metallurgy, for example, for turbine disks, the tools are subjected to extreme loads. Due to the high mechanical and thermal loads, damage to tools and, in particular, breakage of tools may occur, which can lead to defects in the workpiece being processed. For example, at the present time, necessary drill holes in turbine disks are introduced into the turbine disks predominantly by machining methods. Since turbine disks involve high-strength forge alloys largely made of materials based on nickel, the cutting edges of the tool are very strongly stressed during processing by machining and are subject to high wear. Breaks on the cutting edges of tools can cause damage to the turbine disks being processed, which can lead to the circumstance that the disks can no longer be used and represent rejects. Correspondingly, a very large effort and expense are necessary for monitoring and testing.

In addition, it has been known for several decades in the field of engine manufacture to utilize electrochemical drilling for the production of film cooling drill holes in blades of aircraft engines. Of course, in the case of electrochemical production of drill holes, it is a disadvantage that the surface quality of the walls of the drill hole do not satisfy the quality specifications under certain circumstances after the electrochemical drilling. Correspondingly, electrochemical drilling has previously not been used for the production of drill holes in turbine disks, since the dimensional accuracy as well as the surface quality required for these can barely be achieved or achieved only with difficulty.

SUMMARY OF THE INVENTION

It is thus the object of the present invention to provide a method for the production of drill holes with a high ratio of length or depth to diameter (L/D ratio) in difficult to machine materials, such as, for example, alloys based on titanium, nickel, iron or molybdenum, and particularly variants of these alloys produced by powder metallurgy, a method that can be conducted efficiently and makes possible a sufficient quality of the drill hole geometry and surface quality.

This object is achieved by a method of the present invention. In addition, the subject of the present invention is an electrode as discussed in detail below.

In order to achieve the above-named object, the invention proposes to provide an at least two-step method, in which, in the first step, an electrochemical processing takes place in order to produce a drill hole. During the electrochemical processing in the first step, the feed rate of the electrode, by which the electrode is sunk into the material of the component being processed, is adjusted to less than or equal to 20 mm/min, particularly less than or equal to 10 mm/min, preferably less than or equal to 5 mm/min, and the drill hole is fabricated with a slightly smaller diameter than the desired final diameter of the drill hole. In general, diameter means here the distance between two opposite-lying sides of the drill hole, so that not only drill holes with round circular cross section are covered, but also drill holes of any shape whose cross-sectional opening is designed smaller than the cross-sectional opening that is to be finally obtained. The electrode involves a shaped electrode that is adapted in its shape to the drill hole to be produced.

In the second step of the processing, there is a further processing of the drill hole that has been extensively fabricated in the first step in that the drill hole is widened, thus is processed to the desired final diameter of the drill hole. In the second step, the processing can take place by cutting or machining processing or by erosion or by another electrochemical processing, wherein, however, during the electrochemical processing, a feed rate of the electrode is established that is higher than in the first step, namely greater than or equal to 20 mm/min, preferably greater than or equal to 30 mm/min, and, in particular up to 50 or 60 mm/min. Due to the higher feed rate of the electrode during the electrochemical processing in the second step, which can simultaneously also be the final step of the processing, it is assured that the surface quality and the dimensional accuracy of the drill hole will be ensured or improved.

This can also be achieved in that, for the electrochemical processing in the second step of the processing, an electrode is used that has at least one side wall that encloses an angle between 1° and 60° with the longitudinal axis of the electrode that runs along the direction of advance of the electrode, so that an angle between 1° and 60° to the side wall of the drill hole also results. Due to this oblique adjustment of the side wall of the electrode (which is responsible for the electrochemical processing of the side wall of the drill hole) opposite the side wall of the drill hole, an improved surface quality, thus a smoother surface of the side wall of the drill hole is also achieved. The latter results due to the fact that during electrochemical processing, there is a strong dependence of processing quality on the angle of processing. Correspondingly, surfaces in the end gap, thus in the region of the end face of the electrode used for the electrochemical processing, will be formed in an excellent manner, for example, during the perpendicular processing of a material surface by sinking an electrode into the material surface, but the surfaces in the side gap, i.e., with a processing direction of 90° to the direction of movement of the electrode, will be produced with a clearly poorer quality. Therefore, due to the oblique formation of at least one side wall of the electrode, conditions comparable to those on the end face can also be created in the side wall region.

During the electrochemical processing in the second step, in addition, the working gap between electrode and material or component being processed can be adjusted to less than or equal to 75 µm, particularly to less than or equal to 50 µm, which also contributes to the fact that the surface quality of the side wall of the drill hole is improved.

For this purpose, the electrode can also be rotated around the longitudinal axis of the electrode during the electrochemical processing in the second step.

If it is necessary, a third step of the processing can follow the second step of the processing, wherein a machining processing or a special removal method according to DIN 8590, e.g. an erosion method, can be carried out to produce the final diameter in the third step of the further processing of the drill hole.

In order to obtain sharp inlet and outlet edges of the drill hole relative to the surfaces of the component, the edge of the drill hole on the inlet and/or outlet side of the drill hole can be sealed by a sealing element having an opening corresponding to the size of the drill hole. Moreover, it is also possible to provide a sealing element through which a hole is also drilled on the outlet side where the electrode is withdrawn again from the component being processed during the fabrication of the drill hole. In this way, it is ensured that during the removal of the electrode from the material being processed, sufficient electrolyte is present, which is maintained in the drill hole by the sealing element, for a dimensionally accurate processing.

In order to achieve this, the electrolyte, which is introduced at the electrode and into the drill hole for the electrochemical processing, can also be provided on the outlet side of the drill hole prior to the removal of the electrode, in order to ensure that sufficient electrolyte is present for the electrochemical processing, in particular during the electrode penetration.

The feed direction of the electrolyte can be the same direction as the advance of the electrode and/or it can be opposite thereto. In particular, during the final processing in the second step of the processing, the electrolyte in the drill hole can also be conveyed in a direction opposite to the advance of the electrode.

In the method according to the invention, a plurality of drill holes can be produced in parallel with parallelly running electrodes, so that a particularly high efficiency is afforded.

The processing by machining can be conducted by milling, honing, lapping or grinding.

BRIEF DESCRIPTION OF THE DRAWING FIGURES

In the attached drawings, in a purely schematic way:

DESCRIPTION OF THE INVENTION

Further advantages, characteristics, and features of the present invention will become apparent in the following detailed description of the embodiment examples. Of course, the invention is not limited to these embodiment examples.

Figure 1:
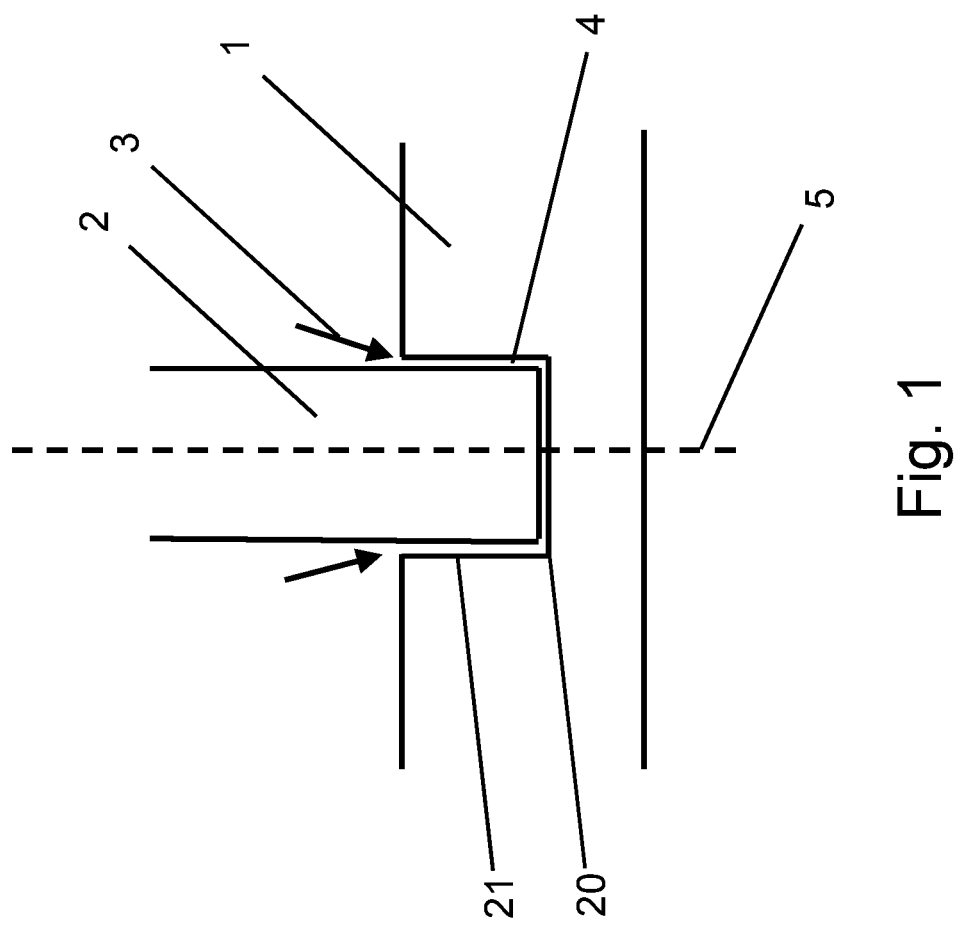
FIG. 1 shows a sectional view of an electrochemical drilling process according to a first embodiment.

FIG. 1 shows in a purely schematic representation a sectional view through a component 1 being drilled and an electrode 2 during the process of electrochemical drilling. FIG. 1 shows the state in which a part of the drill hole has already been introduced in the component 1. Correspondingly, the electrode 2 has already penetrated partially into the material of the component 1. The arrows show the flow of electrolyte in the direction of flow, with which it is ensured that electrolyte that is sufficient for the electrochemical erosion of the material is present in the working gap 4 between the electrode 2 and the component 1. An internal flushing is also possible. During the drilling, an electrical potential is applied between the electrode 2 or cathode 2 and the component 1, so that the material of the component 1 is correspondingly dissolved. The feed rate by which the drilling process is conducted results from the path of the electrode 2 covered per unit of time in the longitudinal direction 5 of the electrode 2. According to the invention, initially, in a first step, a hole is drilled at a low feed rate, this hole being dimensioned smaller than the drill hole that will finally be provided in the component. Correspondingly, in a second step (after the drilling of the drill hole in the first step), the drill hole is widened by introducing a second hole concentric to the first drill hole using a correspondingly greater dimensioned electrode 2 with a higher feed rate. Due to the high feed rate, it can be achieved that the side walls 21 of the drill hole 20 have a smooth surface.

Alternatively, the introduction of the drill hole or the widening of the drill hole 20 in the second step can be conducted by mechanical or machining material processing, for example by milling, grinding, honing, or lapping, or by erosion.

Additionally, in the case of electrochemical drilling, during the second step of the processing, thus when bringing the drill hole to the final dimension, a shaped cathode is utilized, in which one or more side walls 8 of the shaped cathode 2 are inclined at an angle α of 1° to 60° to the side wall 21 of the drill hole 20 or to the longitudinal axis 5. Examples of such shaped cathodes 2 are illustrated in FIGS. 2 to 6.

Figure 2:
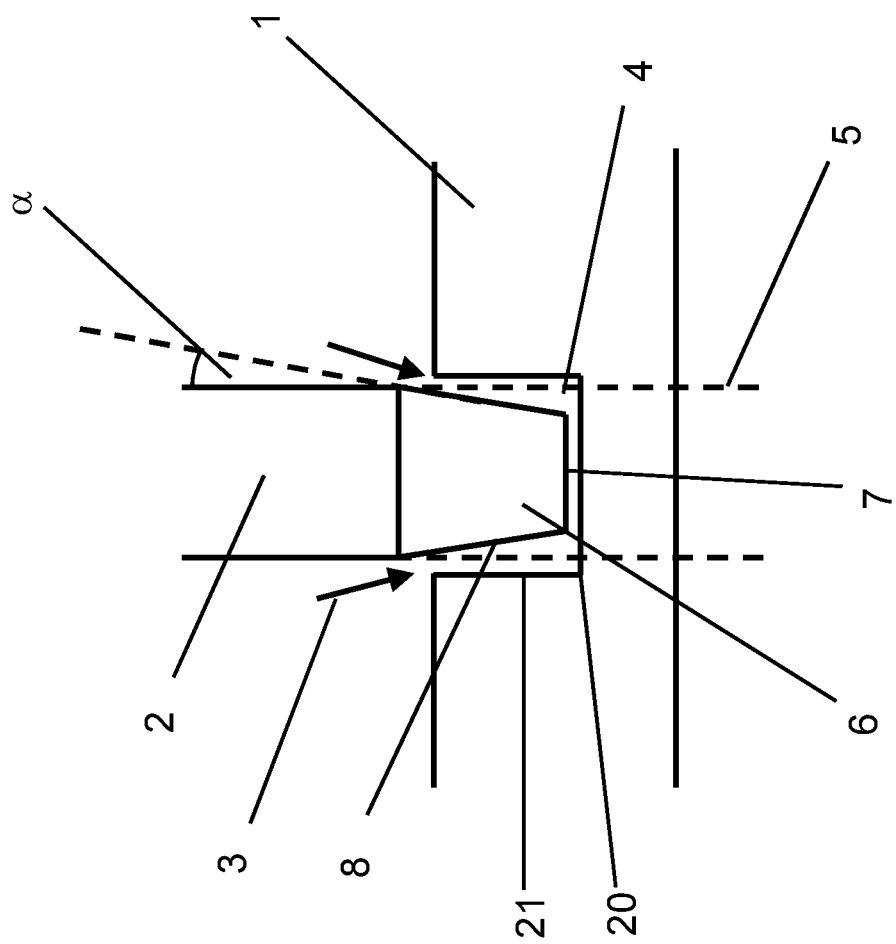
FIG. 2 shows a sectional view of an electrochemical drilling process comparable to FIG. 1 according to a second embodiment.

FIG. 2 shows a shaped cathode 2 in a representation similar to that in FIG. 1 during the drilling of a drill hole 20 in the component 1, wherein the shaped cathode 2 has an electrode tip 6 running conically onto the end face 7 of the electrode 2, so that the conical side wall 8 is inclined at an angle α to the longitudinal axis 5 of the electrode 2 and to the side wall 21 of the drill hole 20.

Figure 3:
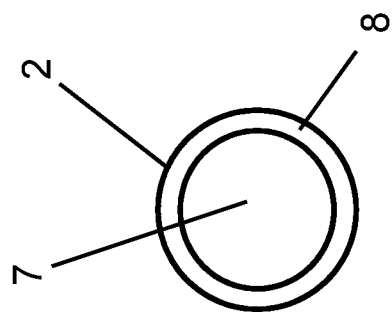
FIG. 3 shows a top view onto the electrode tip of the shaped cathode used in FIG. 2.

FIG. 3 shows the electrode tip 6 in a top view onto the end face 7 of the electrode 2, so that the end face 7 of the electrode 2 as well as the conical side wall 8 of the electrode 2 can be seen in FIG. 3.

Figure 5:
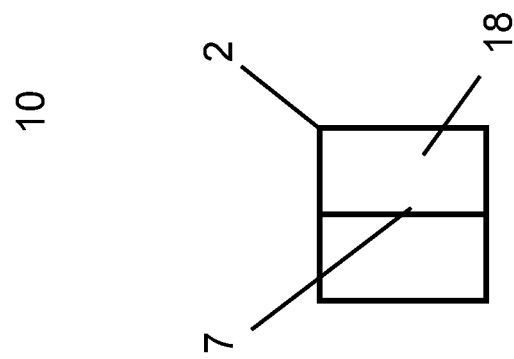
FIG. 5 shows a top view onto the electrode tip of the shaped cathode used in FIG. 4.
Figure 4:
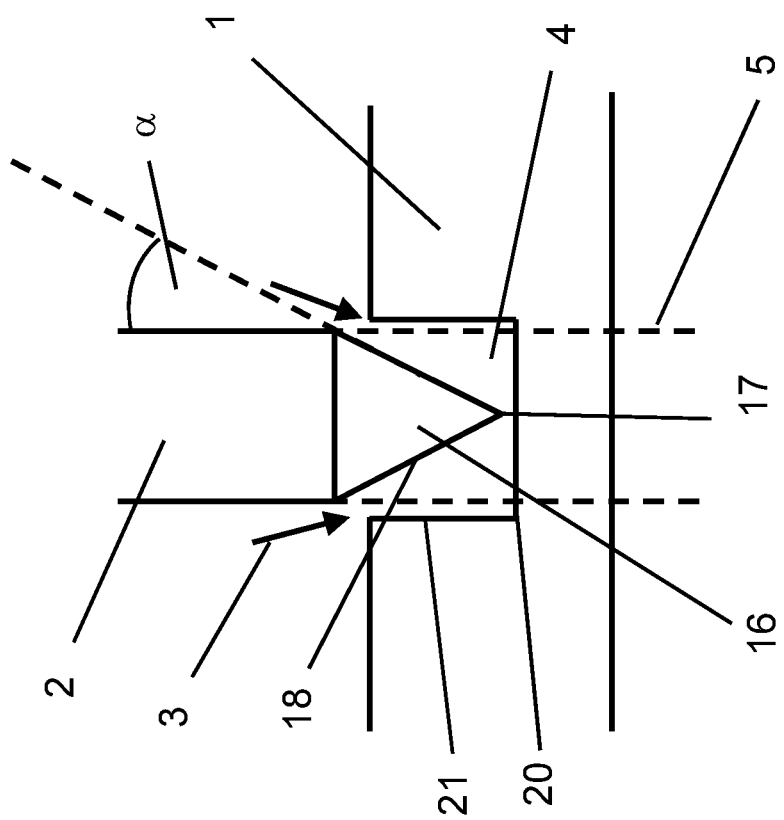
FIG. 4 shows a sectional view of an electrochemical drilling process comparable to FIGS. 1 and 2 according to a third embodiment.

FIGS. 4 and 5 show another exemplary embodiment of a shaped cathode 2, in which an electrode tip 16 with a double-pitch roof shape having two side walls 18 inclined toward the longitudinal axis 5 of the electrode 2 and tapering toward the end face 17 are provided, wherein, contrary to the purely schematic representation, the end faces 17 can be rounded. The electrode 2 is introduced in rotating manner, wherein the electrode 2 is rotated around a central axis of rotation parallel to the longitudinal axis 5, so that at a sufficiently high speed, the two obliquely inclined side walls 18 act as a conically tapering side wall and the edge at the end face 17 represents a planar surface.

Figure 6:
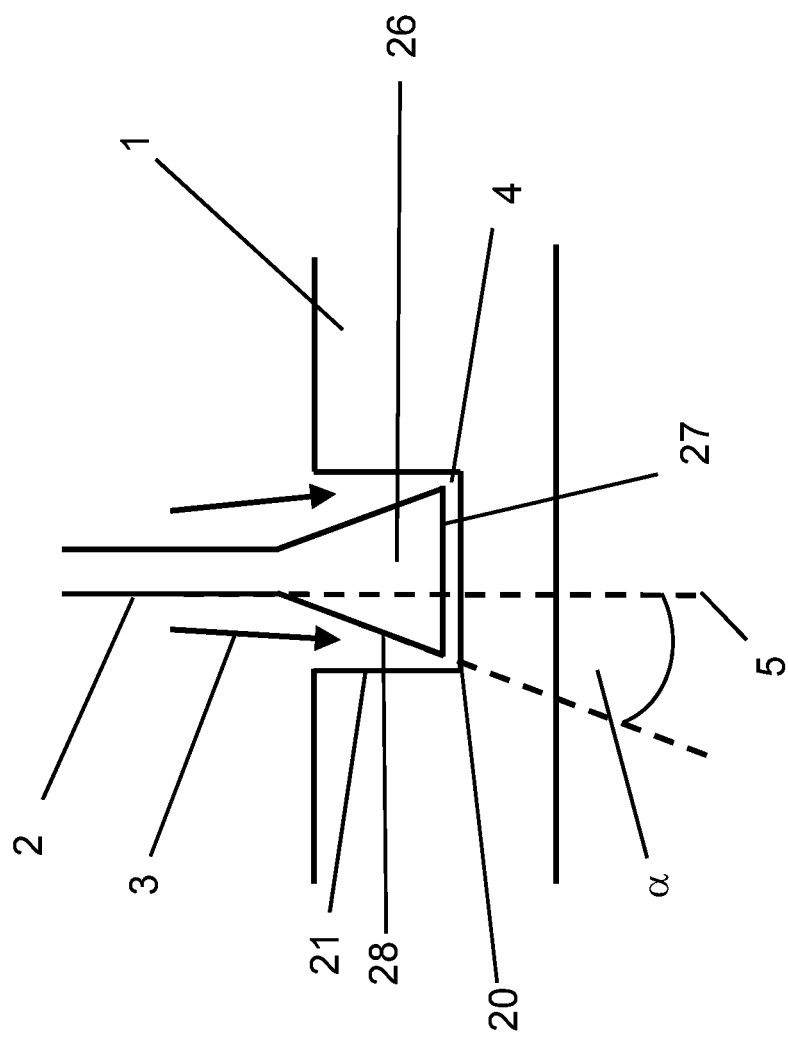
FIG. 6 shows a sectional view of an electrochemical drilling process comparable to FIGS. 1, 2 and 4 according to a fourth embodiment.

FIG. 6 shows another embodiment of a shaped cathode 2 having an electrode tip 26, for which a planar end face 27 is provided, which has a shape and a diameter corresponding to the drill hole 20 being introduced, wherein the electrode 2 is tapered pointing away from the end face 27, so that again a conically tapering side wall 28 is formed, which encloses an angle α to the longitudinal axis 5 of the electrode 2.

Due to the side walls 8, 18, 28 of the electrode 2 running obliquely to the longitudinal axis 5 or to the side wall 21 of the drill hole 20, a smoothing of the surface of the side walls 21 is also brought about.

Figure 7:
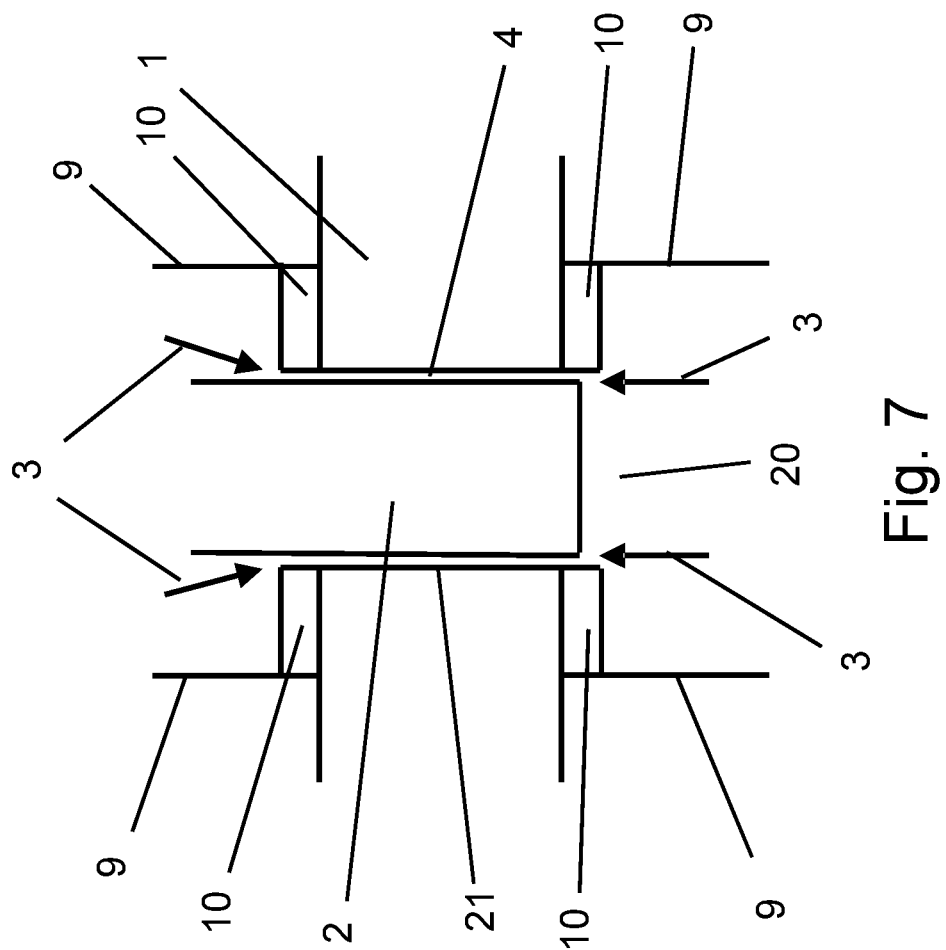
FIG. 7 shows a sectional view of an electrochemical drilling process comparable to FIGS. 1, 2, 4 and 6 according to a fifth embodiment.

FIG. 7 shows a sectional view in the case of an electrochemical drilling, in which the drill hole 20 is already formed throughout in the component 1. FIG. 7 illustrates that, during the electrochemical drilling, elements for electrolyte conveyance 9 can be arranged and these prevent the electrolyte from reaching a region of the component 1 that is not to be processed. In the region of the drill hole 20, correspondingly, a seal 10 can be provided, which covers the edge of the drill hole 20 and seals off the electrolyte conveyance 9.

Corresponding measures for electrolyte conveyance 9 and for sealing can be provided both on the inlet side of the electrode 2 into the drill hole 20 as well as on the opposite-lying side of the component at the outlet side of the electrode 2 from the component 1.

Moreover, FIG. 7 shows that an introduction of electrolyte can also be provided by a flow 3 of electrolyte at the outlet side, so that a sufficient provision of electrolyte is assured during the penetration of the electrode 2.

Additionally, particularly in the case of electrochemical processing in the second step, thus the final processing of the drill hole 20, an electrolyte flow 3 can be provided opposite to the direction of advance of the electrode 2.

Figure 8:
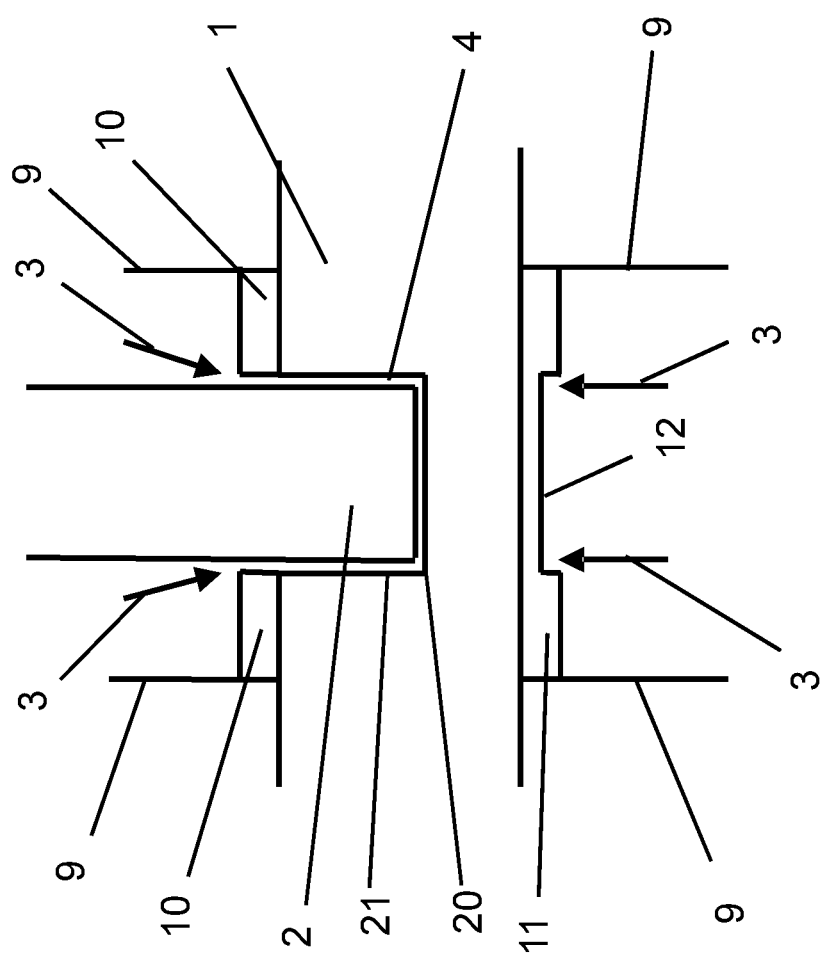
FIG. 8 shows a sectional view of an electrochemical drilling process comparable to FIGS. 1, 2, 4, 6 and 7 according to a fifth embodiment.

FIG. 8 shows another exemplary embodiment, wherein the electrode 2 has first created a part of the drill hole 2, while a thickness of the component 1 still remains to be drilled. As has already been mentioned above, a supply of electrolyte can also be assured at the site of penetration in order to be able to provide sufficient electrolyte in the penetration region during the penetration of the electrode 2. Correspondingly, in this exemplary embodiment, a sealing element 11 of a metal material is provided at the outlet side, and this sealing element completely covers the drilling opening being drilled up to and over the edge, and has a penetration site 12, which also will be drilled through in order to ensure a sharp outlet edge of the drill hole. Correspondingly, in this embodiment, the provision of an electrolyte conveyance can be omitted at the outlet side of the electrode 2, since it is assured by the sealing element 11 that sufficient electrolyte can be provided in the drill hole 20 up to the conclusion.

Although the present invention has been described in detail on the basis of the embodiment examples, it is obvious to the person skilled in the art that the invention is not limited to these embodiment examples, but rather that modifications are possible in a way such that individual features can be omitted or other kinds of combinations of features can be produced without departing from the protective scope of the appended claims. In particular, the present disclosure encompasses all combinations of the individual features shown in the different examples of embodiment, so that individual features that are described only in conjunction with one exemplary embodiment can also be used in other exemplary embodiments or combinations of individual features that are not explicitly shown can also be employed.

What is claimed is:

1. A method for the production of drill holes having improved surface quality and dimensional accuracy in difficult to machine materials, in which a removal of material takes place in order to produce a drill hole by electrochemical erosion of material by first and second electrodes that are moved in the longitudinal direction of the drill hole being produced in the direction onto the material to be processed at a feed rate, wherein the drilling proceeds in at least two steps, wherein, in the first step, the electrochemical processing takes place using the first electrode having an electrode tip on which at least one electrochemically active side wall is formed that runs obliquely to the longitudinal axis of the first electrode, in which the feed rate of the first electrode is less than or equal to 5 mm/min during the electrochemical material erosion and the drill hole is fabricated with a drill hole diameter that is 0.05 to 2 mm smaller than a final diameter of the drill hole, wherein, in a second step, the further processing of the drill hole to the final diameter takes place by an electrochemical processing using the second electrode having at least one side wall that encloses an angle between 1 and 60° with the longitudinal axis of the electrode that runs along the direction of the electrode advance in which the feed rate of the second electrode is greater than 50 mm/min and less than or equal to 60 mm/min, and wherein the difficult to machine materials are alloys based on Ti, Fe, Ni, or Mo, and the difficult to machine materials are alloys produced by powder metallurgy.

2. The method according to claim 1, wherein, during the electrochemical processing in the second step, a gap is established between the second electrode and the material being processed, the gap being less than or equal to 75 µm.

3. The method according to claim 1, wherein the first and/or second electrodes are rotated around the electrode longitudinal axis during the electrochemical processing in the first and/or second step.

4. The method according to claim 1, wherein, after the second step of the processing, a third processing step takes place, wherein, in the third step, the further processing of the drill hole to the final diameter takes place by machining processing or by erosion.

5. The method according to claim 1, wherein, during the electrochemical processing, the edge of the drill hole at an inlet and/or outlet side of the drill hole for the electrode is covered by a seal having an opening corresponding to the size of the drill hole, or a metal sealing element that is likewise to be drilled through.

6. The method according to claim 1, wherein, during the electrochemical processing, an electrolyte necessary for processing is introduced in the direction of advance of the second electrode, during the electrochemical processing in the first step of the drilling, and/or is introduced counter to the direction of advance of the second electrode, during the electrochemical processing in the second step of the drilling.

7. The method according to claim 1, wherein, during the electrochemical processing, an electrolyte is provided on the side of the material being processed, which is the outlet side of the drill hole for the first and second electrodes, prior to the withdrawal of the first and second electrodes.

8. The method according to claim 1, wherein a plurality of drill holes is produced in parallel with a plurality of first and second electrodes running in parallel.

9. The method according to claim 1, wherein the method is used for components of turbomachines or aircraft engines.

10. The method according to claim 1, wherein the obliquely running side wall is the side wall of a cone or truncated cone.

* * * * *